3,397,166
METHOD OF PREPARING POLYMER DISPERSIONS IN A MIXED HYDROCARBON AND FLUORINATED HYDROCARBON SOLVENT MEDIA
Claude J. Schmidle and George I. Brown, Moorestown, N.J., assignors to Rohm & Haas Company, Philadelphia, Pa., a corporation of Delaware
No Drawing. Filed Feb. 13, 1961, Ser. No. 88,631
4 Claims. (Cl. 260—33.6)

The present invention is concerned with the production of dispersions of polymers within organic liquid media in which the polymers are relatively insoluble and it is particularly concerned with polymer dispersions in liquids composed of a mixture of at least one hydrocarbon and at least one halogenated hydrocarbon. The invention is concerned with a polymerization technique in which the monomers are polymerized within organic liquids in which the polymer obtained is relatively insoluble, the polymerization being effected in the presence of a dispersing agent for maintaining the polymer produced as discrete praticles in dispersed condition within the polymerization medium.

It is an object of the present invention to provide dispersions of synthetic addition polymers in organic liquid media composed of a mixture of at least one hydrocarbon and at least one halogenated hydrocarbon using essentially hydrophobic dispersing agents for maintaining the insoluble polymer particles dispersed in the system in substantially stable form. It is another object of the invention to provide a polymerization system adapted to be varied widely in respect to viscosity characteristics merely by the choice of solvent or one or more components thereof. Another object of the present invention is to provide a polymer dispersion in organic liquids composed of a mixture of at least one hydrocarbon and at least one halogenated hydrocarbon comprising discrete particles of the polymer which are insoluble in the liquid but dispersed therein by means of a substantially hydrophobic dispersing agent whereby films, coatings, and impregnations obtained from the dispersions are of quite hydrophobic character and consequently resistant to moisture. Another object of the invention is to provide a polymer system of essentially inert, non-aqueous or anhydrous type which, because of its non-aqueous quality, is adapted to the production of dispersed polymer systems in which the polymer is of crystalline character. Another object of the invention is to provide a polymerization system which is adapted to produce dispersions of discrete insoluble particles within organic solvents using monomers which because of their reactive character are incapable of polymerization in aqueous systems.

Another object of the invention is to provide a polymerization system in a non-aqueous medium or vehicle whereby, because of the non-aqueous character, a wider variety of polymerization techniques may be employed in the production of the polymer. Thus, in the polymerization systems of the present invention, the polymerization may be effected not only by the use of free-radical initiators but also by anionic and cationic techniques which latter two techniques cannot be performed in an aqueous system. Another object of the invention is to provide for the preparation of water-soluble polymers in an anhydrous medium. Other objects and advantages of the invention will be apparent from the description thereof hereinafter.

In accordance with the present invention, polymerizable and copolymerizable ethylenically unsaturated monomers having at least one group of the formula $CH_2{=}C{=}$ are polymerized to form addition polymers of either linear or cross-linked type in a mixed hydrocarbon-halohydrocarbon solvent medium containing a dispersing agent of polymeric character which is also of essentially hydrophobic nature. The dispersing agent may be formed in situ in the polymerization medium or it may be formed before it is introduced into the polymerization medium in which the main polymer is to be prepared. Alternatively, the polymerization may be carried out in a solvent medium composed of one or more hydrocarbons and, during or about polymerization, a halohydrocarbon is added to the polymer dispersion.

Liquids that may be used in the polymerization system of the present invention include any liquid hydrocarbon whether formed of a single compound or of a mixture of compounds. The hydrocarbon may be of aliphatic character, either acyclic or alicyclic, aromatic, or naphthenic, or the polymerization medium may be made up of a mixture of these various types of hydrocarbons. Examples of individual hydrocarbons that may be employed include propane, cyclopropane, butane, pentane, n-hexane, cyclopentane, cyclohexane, n-heptane, n - octane, iso - octane, benzene, toluene, xylene (o-, m-, p-xylene). Commercially-available hydrocarbon mixtures may be employed such as mineral spirits, gasoline, xylene mixtures, terpenes, solvent naphthas of aromatic, aliphatic, or naphthenic character, alkyl benzenes in which the alkyl group or groups have from 1 to 4 carbon atoms, octane fractions which contain a mixture of octane isomers, and so on. Generally, it is preferred to employ as the hydrocarbon component a hydrocarbon liquid medium comprising at least 50% by weight of non-aromatic components, and especially those of aliphatic or paraffinic make-up. This preference has the advantage of lower cost.

The halohydrocarbon is a fluorohydrocarbon which may contain from 1 to 3 halogen atoms such as chlorine in an aliphatic hydrocarbon compound having from 1 to 5 carbon atoms either in a chain, a branched chain, or a ring. The hydrocarbons may be perfluorinated or not. As stated above, they may contain 1 or 3 chlorine atoms in addition to fluorine. The preferred compounds are those having the formula $$C_nCl_{m-1}F_{2n+3-m}$$

wherein $n$ is an integer having a value of 1 to 5, and $m$ is an integer having a value of 1 to 4. These fluorinated or fluorochlorinated hydrocarbons have various volatilities. In general, they evaporate quite readily under normal conditions of drying, even at room temperature. They are liquid or gaseous at normal room temperature, and the most highly volatile of the group are preferred for the purpose of making aerosol-type sprays containing the dispersed polymers. Examples of these fluorohydrocarbons are monochlorotrifluoromethane, dichlorodifluoromethane and trichlorofluoromethane, which are extremely valuable for the making of aerosol-type sprays, dichlorotetrafluoroethane, monochloropentafluoroethane and perfluoroethane, which are also useful for the making of aerosol sprays, perfluoropropane, perfluorobutane, and perfluoropentanes, including perfluorocyclopentane. These perfluoro compounds are also quite volatile and may be used for the making of aerosol-type sprays but are somewhat more expensive than the preferred compounds mentioned for this purpose. Other compounds include monochloroheptafluoropropane, dichlorohexafluoropropane, monochlorononafluorobutane, dichlorooctafluorobutane, and dichlorodecafluoropentane. The ratio between the hydrocarbon and the fluorohydrocarbon contents in the mixture making up the polymerization medium or the medium in which the polymer is dispersed after addition of the halohydrocarbon is from 1:10 to 10:1. Preferably, the ratio is from 1:2 to 2:1 by weight.

It is essential that the hydrocarbon or hydrocarbon-halohydrocarbon mixture be of liquid character, but it may have a wide boiling range from a minimum of about −50° C. (in which case high pressures may be needed in the polymerization) to a maximum which may be as high as 300° C. For most purposes, the boiling point should be from about 0° C. up to about 200° C. The boiling point or boiling range of the liquid hydrocarbon system may be chosen as desired to be suitable for the particular operation in which the polymer dispersion prepared in the hydrocarbon is to be used. Thus, in coating or impregnating operations intended to be carried out in low temperature climates, a liquid hydrocarbon medium having a relatively low boiling point such as from about 30° to 35° C. may be preferred. A similar boiling point range may be selected for pressure systems, as in aerosol sprays. On the other hand, where the coating and impregnating operation is to be carried out in equipment provided with relatively high temperature drying ovens or rolls, the hydrocarbon system may have extremely high boiling points such as from 275° to 300° C. However, for most purposes, it is preferred to employ liquids boiling in the range from about 50° C. to about 235° C.

It is essential to select the hydrocarbon or hydrocarbon-halohydrocarbon mixture with the particular polymer to be prepared therein in mind. The hydrocarbon or hydrocarbon-halohydrocarbon medium should be such that the polymer formed is relatively insoluble therein. This does not preclude the use of a hydrocarbon or hydrocarbon-halohydrocarbon medium capable of swelling the polymer or of dissolving in the polymer up to 1% or even 50% on the weight of the polymer. A small proportion up to 10% of the polymer prepared may be of low molecular weight and soluble in the hydrocarbon or hydrocarbon-halodrocarbon medium. When the polymer prepared in the system has an appreciable solubility within the hydrocarbon or hydrocarbon-halohydrocarbon medium that portion which dissolves serves to thicken the system. By employing a composite liquid medium in which one of the components exerts a solvent action on the polymer and the other is substantially completely inert controlled viscosity can be obtained merely by adjusting the proportions of the two components of the mixture. For example a mixture of octane and toluene may be employed for the preparation of a dispersion of a polymer which has complete solubility in toluene and substantially no solubility in octane. By increasing or decreasing the proportion of toluene in the system the viscosity in the system may be varied as desired from a very high value down to a very low value approaching that of the liquid used for the vehicle. In all of the systems of the present invention, the largest portion of the polymer, at least 90% by weight thereof, remains in undissolved condition dispersed in the system as discrete particles having sizes of about 0.05 to 10 microns or less, and preferably from about 0.1 to 2 microns, by a dispersant more particularly described hereinafter.

The essentially hydrophobic dispersing agents employed in the systems of the present invention are of polymeric character. The polymeric dispersing agent contains in its molecule two essentially different portions or components, one of which is preferentially soluble in, or miscible with, the hydrocarbon or hydrocarbon-halohydrocarbon medium at least to that degree which would result in the formation of a colloidal solution thereof, which portion may or may not be incompatible with the polymer to be dispersed which may be termed the main or primary polymer in the system. The other component or portion of the polymeric dispersant molecule is preferentially soluble in, or miscible with, the main polymer which portion may or may not be incompatible with the hydrocarbon or hydrocarbon-halohydrocarbon medium. Thus, the first-mentioned portion has a stronger affinity for the hydrocarbon or hydrocarbon-halohydrocarbon medium than the other whereas the second-mentioned portion has a stronger affinity for the main polymer. The second-mentioned component of the dispersing agent may be introduced into the polymeric dispersing agent molecule by a grafting operation wherein there is used a monomer which is of the same chemical constitution, or of sufficiently similar chemical constitution, as that of the monomer or monomers employed in the formation of the main polymer so that the portion of the dispersing agent molecule derived therefrom is compatible or miscible with the main or primary polymer.

The formation of the dispersing agent may be effected in situ simultaneously with the main polymerization. Alternatively, the dispersing agent may be formed by a separate preliminary graft polymerization and then introduced into the main polymerization system. The dispersing agent may be formed by milling a polymeric precursor, such as natural rubber, with a grafting monomer or polymer thereof.

The polymeric precursors adapted to form the polymeric dispersants include natural synthetic rubbers, hydrocarbon-soluble or halohydrocarbon-soluble acrylic polymers, various modified or oxidized vegetable oils, and other hydrocarbon polymers, examples of which are described as follows:

Besides natural rubber, which may be in the form of raw crepe rubber or milled crepe rubber, pale or dark, reclaimed rubber (either of natural or synthetic types), cyclized, or milled-cyclized rubber may be employed. Among the synthetic rubbers that may be employed as precursors for forming the polymeric dispersants are polyisobutylene, polyisoprene, polychloroprene, copolymers of isoprene and isobutylene, particularly those containing from 1 to 25% of isoprene, and copolymers of chloroprene and isobutylene; chlorinated butyl rubbers, that is chlorinated polymers of isoprene, isobutylene, or copolymers thereof, polymers of butadiene including the liquid polybutadienes as well as the solid types, copolymers of butadiene with acrylonitrile and of butadiene and styrene including GRS rubber. In general, there may be employed as the precursors any of the so-called butalastic polymers such as are prepared by polymerizing diolefins, halogen-substituted or other substituted diolefins, or by copolymerizing diolefins with other copolymerizable monoethylenically unsaturated compounds containing vinyl or vinylidene groups such as acrylonitrile, acrylates (e.g., methyl, ethyl, or butyl acrylates or methacrylates), styrene, halogen-substituted styrenes (e.g., mono- or di-chlorostyrenes or mono- or di-bromostyrenes), or alkyl styrenes such as methylstyrenes or dimethylstyrenes. More particularly, the butalastic polymers may be obtained by polymerizing a conjugated diolefin such as butadiene, isoprene, dimethylbutadiene, and chloroprene, or by copolymerizing butadiene and styrene, butadiene and vinyltoluene, butadiene and acrylonitrile, butadiene and isobutylene, or isoprene and isobutylene. Generically, butalastic polymers are defined by Marchionna [Marchionna, "Butalastic Polymers," Rheinhold (1946)] as synthetic, elastic polymers of a butadiene compound with or without other compounds polymerizable therewith.

Among the synthetic linear polymers of acrylic type that may be employed as the precursors are the oil-soluble types of polymeric esters of acrylic acid or methacrylic acid such as copolymers of esters of methacrylic acid or acrylic acid formed with alcohols having 4 to 18 carbon atoms or of mixtures of such esters with esters of methacrylic acid or acrylic acid formed with alcohols having 1 to 5 carbon atoms, wherein sufficient hydrocarbon groups of at least four carbon atoms are present to impart solubility of the precursor in the solvent medium used in the polymerization system. Mixtures of methacrylate and acrylate esters can be used in the production of the solvent-soluble precursors. Such polymeric precursors may also include in the copolymer molecule substantial proportions from 1% to as much as 50% by weight of units derived from other monoethylenically unsaturated monomers such as maleic anhydride, acrylic acid, methacrylic acid, vinyl pyrrolidone, N-dimethylaminoethyl acrylate or methacrylate, N,N-dimethylaminoethyl acrylamide or methacrylamide, dimethylaminoethyl vinyl ether, dimethylaminoethyl vinyl sulfide, ureidoalkyl vinyl ether or sulfide, such as the ureidoethyl vinyl ether or sulfide, vinyl chloride, vinylidene chloride, vinyl acetate, vinyl propionate, vinyl laurate, vinyl stearate, vinyl oleate, ethylene, isobutylene, acrylamide, methacrylamide, acrylonitrile, methacrylonitrile, vinyl ethyl ether, vinyl isobutyl ether. Polymers soluble in the hydrocarbon or mixed hydrocarbon/halohydrocarbon polymerization medium and containing 50% to 100% by weight of vinyl alkly ethers, such as vinyl methyl ether, vinyl ethyl ether, and vinyl isobutyl ether, vinyl esters of higher fatty acids having from 6 to 18 carbon atoms, such as vinyl hexanoate, vinyl laurate, vinyl oleate and vinyl stearate are also useful precursors.

As the precursor for the polymeric dispersant, oxidized vegetable oils such as blown linseed oil, blown castor oil, and the like may be employed.

Polymers of terpenes such as the polymers obtained by the acid catalysis (the Friedel-Crafts type of catalyst) of β-pinene or terpene mixtures containing it may be employed.

In general, the molecular weight of the dispersing agent may be of a wide range, but preferably it is from one-tenth to ten times that of the main polymer.

The monomers which are adapted to be converted into dispersed polymers by the polymerization system of the present invention may be selected from a wide variety such as the vinyl esters of fatty acids having from 1 to 18 carbon atoms including vinyl acetate, vinyl propionate, vinyl butyrate, vinyl laurate, vinyl oleate, and vinyl stearate. Esters of acrylic acid or of methacrylic acid with alcohols having from 1 to 18 carbon atoms may likewise be employed. Examples include methyl acrylate or methacrylate, ethyl acrylate or methacrylate, propyl acrylate or methacrylate, isopropyl acrylate or methacrylate, the various butyl acrylates or methacrylates, cyclohexyl acrylate or methacrylate, benzyl acrylate or methacrylate, phenyl acryalte or methacrylates, n-hexyl, t-octyl, dodecyl, hexadecyl, or octadecyl acrylates or methacrylates. Acrylonitrile, methacrylonitrile, acrylamide, methacrylamide, styrene, α-methyl styrene, vinyl toluenes, acrylic acid, acrylic acid anhydride, methacrylic acid, methacrylic acid anhydried, fumaric acid, crotonic acid, allyl acetate, glycidyl methacrylate, t-butylaminoethyl methacrylate, hydroxyalkyl acrylates or methacrylates such as β-hydroxyethyl methacrylate, β-hydroxyethyl vinyl ether, β-hydroxyethyl vinyl sulfide, vinyl pyrrolidone, N,N-dimethylaminoethyl methacrylate, ethylene, propylene, vinyl fluoride, vinylidene fluoride, hexafluoropropylene, chlorotrifluoroethylene, and tetrafluoroethylene may also be used as the monomers for making the main polymer. Copolymers of the various monomers just mentioned may be prepared by the polymerization system of the present invention and copolymers of any one or more of the above-mentioned monomers with up to 50% by weight of maleic anhydride may be formed by the system of the present invention.

To illustrate the need for consideration of the particular monomer in selecting the medium, when the polymer is formed largely of styrene, the hydrocarbon selected should be of acyclic aliphatic character in which the polymer is insoluble since hydrocarbon media having a large aromatic component would dissolve the polymer.

In the polymerization system of the present invention, several variations in procedure may be employed. The most readily adaptable system which is also highly convenient to use is that of free-radical type polymerization. This type of polymerization employs a free-radical catalyst of azo or peroxygen type. Examples include benzoyl peroxide, lauroyl peroxide, acetyl peroxide, cumene hydroperoxide, paramenthane hydroperoxide, azodiisobutyronitrile, dimethyl azodiisobutyrate, and so on. Any of the free-radical type catalysts which are soluble in the monomer or the hydrocarbon or hydrocarbon-halohydrocarbon medium may be employed. Free-radical catalysts which are activated by means of amines such as triethylenetetramine and those activated by various salts such as cobalt naphthenate are suitable. In general, any free-radical catalyst that can be used for bulk or solution polymerization of the monomers herein enumerated can be employed in the present invention. The proportion of catalyst may be from 0.1% to 3% of the weight of monomer or monomers. The amount employed may depend on the method of addition and the molecular weight desired in the dispersed polymer. Of course, the catalyst may be added all at once or in portions at periodic intervals.

(A) Free radical system with preliminary precursor activation step

The simplest procedure involving the free-radical type of polymerization is to dissolve the dispersing agent precursor in the liquid hydrocarbon which is to serve as the medium of polymerization. The proportion of the precursor may be from about 2 to 20% of the weight of polymer to be dispersed by the dispersing agent. In fact, the proportion of dispersing agent may even be much higher such as up to 30% or more in the systems of the present invention since the dispersing agent is of water-insensitive character and films or coatings obtained from the polymer dispersions prepared therewith are not susceptible to deterioration or disintegration by moisture or high humidity. To the solution of the precursor in the hydrocarbon or hydrocarbon-halohydrocarbon medium, the catalyst or initiator is added. The proportion of initiator may be from 0.1 to 5% by weight of the precursor. After addition of the initiator to the solution of precursor, the mixture is heated to temperatures of 65° to 120° C. or more (keeping below the decomposition temperature of the precursor). The time for this preliminary heating may vary depending upon the particular precursor, the time being longer at lower temperatures and shorter at the higher temperatures. For example, the time may vary from 5 minutes up to an hour or more. When the precursor is of a character which is capable of cross-linking on heating, the temperature should be kept below the temperature which would effect cross-linking.

After active sites are formed on the precursor in this manner, the monomer or monomers to be polymerized to form the main polymer are introduced along with additional catalyst if needed. The mixture is heated with continued agitation to a suitable polymerization temperature which depends upon the particular initiator and the particular monomer. In some cases instead of heating, the system may simply be allowed to react at room temperature or it may be cooled particularly when an activated peroxide initiator is used. With such activated catalysts, temperatures of −5° to −10° C. may be employed. In other systems, the temperatures may be raised to as much as 50° C. or as high as 120° C. or higher depending upon the vapor pressure of the hydrocarbons, halohydrocarbons, and monomers and available pressure equipment to avoid loss by volatilaztion. Generally, the temperature is controlled to avoid too rapid a polymerization and to avoid such a high temperature as to preclude the grafting of a portion of the monomer upon the dispersing precursor. In general, the polymerization is carried to as high a conversion as is practical in a suitable period of time. As much as 94 to 98% conversion can be obtained in a period of one-half to 48 hours depending upon the particular monomers and initiators and proportions. For most practical operations, 2 to 10 hours may be employed. The proportion of monomers added to the precursor solution may vary over a wide range so as to provide a main polymer concentration from about 1% to about 55% or more in the polymer dispersion prepared.

After completion of the polymerization, the final concentration of the polymer dispersion may be varied by dilution with additional liquid hydrocarbon or by the removal, such as by distillation, of a portion of the hydrocarbon medium, during which a portion or all of any residual monomer may also be removed. In this manner polymer dispersions containing as low as 1% concentration or less or as high as 50 to 65% may be obtained. For most purposes, concentrations of 10 to 45% of dispersed polymer (excluding dispersing agent polymer) are generally employed.

(B) Free-radical system without preliminary precursor activation step

A variation of the procedure just described involves the dissolution of the polymeric precursor of the dispersing agent, the monomer to be polymerized to form the main polymer, and the free-radical initiator in the hydrocarbon medium. After preparing this mixture, it may be heated (or cooled) with agitation under conditions generally consistent with those suggested in the preceding description to effect polymerization. The proportion of initiator may be from 0.01 to 5% by weight of the total weight of monomer and precursor and the concentration of monomer may be such as to result in a main polymer concentration of 1 to 60% or more.

In either of the two procedures of preparing the polymer dispersions just described (under headings A and B), there may be present an excess of the precursor over that which is copolymerized with a portion of the monomer by grafting so that in effect, the resulting polymer dispersion also contains an amount of precursor which is not modified by grafting with the added monomer. The result is a blended polymer composition of its own distinctive character. This is particularly advantageous in the preparation of a pigmented polymer dispersion intended to be employed as a paint, wherein the precursor employed is an oxidized linseed oil. As much as 50 to 95% of the precursor may thus be unmodified by grafting and form a substantial component in the final polymeric system.

(C) Free-radical preliminary formation of dispersing agent

Another modification involves the heating of the solution of the precursor containing the free-radical initiator as in the first procedure (A) described, but adding only a limited proportion of the monomer as the second step after the formation of active sites on the precursor. Thus, only 10 to 150% by weight, based on the weight of precursor, of the monomer or monomer mixture is added. At this point, the system is heated with continued agitation to effect copolymerization and grafting of the monomer or momomers on the precursor. After substantial grafting has been effected, the remainder of the monomer is added and polymerization is continued as before to form the main polymer. In this case, if an activated peroxide is employed as initiator, the polymerization in both the grafting and final polymerization stages may be effected at low temperatures of −5° to −10° C. as before.

(D) Cationic systems

Instead of employing a free-radical system, a cationic polymerization system or technique may be employed. This uses the conventional Friedel-Crafts or acidic catalysts such as aluminum chloride, stannic chloride, boron fluoride and its complex such as the etherates, titanium tetrachloride, aluminum bromide, surfuric acid, and certain activated clays. The proportion of catalyst employed in this system may be from 0.1 to 1% on the monomer in the final dispersion prepared. In this system, the precursor may first be introduced into the hydrocarbon medium with the Friedel-Crafts catalyst, the monomers are introduced into the solution, and the polymerization is carried out to form a polymer from the monomer. This system is particularly adapted to the polymerization of the lower alkyl vinyl ethers such as the methyl, ethyl, propyl, isopropyl, n-butyl, sec-butyl, isobutyl, and t-butyl vinyl ethers, α-methyl styrene, and alkoxy-α-methyl styrenes, such as paramethoxy-α-methyl styrene, and other monomers having an electron donor group on the double bond.

The cationic system may be varied by introducting into the hydrocarbon or hydrocarbon-halohydrocarbon medium not only the acidic catalyst but also the monomers and a grafted precursor such as that prepared with a free-radical initiator and 10 to 150% of the monomer on the precursor as described thereinabove in procedure C. In general, this is the preferred manner of preparing a polymer dispersion when using a cationic polymerization system for forming the main polymer dispersed therein.

(E) Anionic systems

The same procedures as described hereinabove (A, B, and C) for making the polymer dispersions by a free-radical type of polymerization may be employed with an anionic technique. In this technique, the catalysts are of anionic type including such materials as butyllithium, butylmagnesium bromide, phenylmagnesium bromide, triphenylmethylsodium, sodium naphthalene, 9-fluoroenyllithium, and dipotassiumstilbene. The proportion of this catalyst is from 0.1 to 5% on the weight of the monomers. This system is particularly adapted to the polymerization of such monomers as vinylidene cyanide, esters of α-cyano acrylic acid, or α-cyano methacrylic acid, esters of α-cyano vinyl sulfonic acid, α-trifluoro methyl acrylonitrile, N,N-dialkyl-substituted acrylamides and -methacrylamides, itaconic acid esters, acrylic acid esters and methacrylic acid esters, acrylonitrile, methacrylonitrile, and ethylene, particularly using the anionic Ziegler catalysts. The anionic system may also be employed only for the polymerization of the main polymer in which event the precursor graft or dispersing agent may be prepared by the free-radical system using 10 to 150% of the monomer on the precursor as above in procedure C and the main polymer then prepared in a dispersion of the monomer or monomers with the dispersing agent and the anionic catalyst in the hydrocarbon medium.

As pointed out hereinabove, the products are dispersions in liquid media composed of a mixture of at least one hydrocarbon and at least one halogenated hydrocarbon containing discrete particles of the main polymer dispersed by a polymeric dispersing agent. Generally, the polymer dispersions of the present invention may have concentrations varying from 1 to 55% or higher solids. These compositions, as pointed out hereinabove, are dilutable by the addition of a suitable liquid hydrocarbon or halohydrocarbon mentioned hereinabove to any desired concentration for application for the coating and impregnation of various substrates as well as for the formation of free films by casting techniques. Thus, the polymer dispersions may be employed for the impregnation and coating of textile fabrics, paper, paperboards, leathers, wood, metals, ceramics, concrete, bricks, stones, plaster, vinyl wall tile and flooring tile, linoleum, asphalt tile, and asbestos cement products including siding and shingles. As pointed out hereinabove, the coatings and impregnations thereby obtained are insensitive to water by virtue of the fact that there is present no hydrophilic emulsifier or dispersant. The viscosity of the dispersion is adapted to be easily controlled merely by the addition of a solvent or swelling agent for the dispersant or by decreasing the relative proportion of such a solvent or swelling agent simply by adding a hydrocarbon which has no solvent or swelling action on the dispersed polymer.

The polymer dispersions of the present invention are adapted to be modified by the incorporation of drying oils, pigments, fillers, dyes, as well as plasticizers, and polymeric or resinous materials which are soluble in the liquid vehicle including fatty acid-modified shellac, gums, natural resins, waxes, asphalt, bitumens, epoxidized fatty oils, epoxy resins, organic-soluble alkylated methylolated aminoplast resins including the condensates of formaldehyde with urea, melamine, thiourea, benzoguanamine, ethyleneurea, alkylated with an alcohol having 2 to 6 carbon atoms such as n-butanol. Among other materials that can be incorporated are the alkyds, organic solvent-soluble vinyl and acrylic resins with or without plasticizers including plastisols obtained from polyvinyl chloride, or copolymers of vinyl chloride and plasticizers therefor.

In the following examples which are illustrative of the invention, the parts and percentages are by weight unless otherwise noted.

EXAMPLE 1

(a) An 11.2% solution of pale crepe rubber was prepared in a mixture of equal parts by weight of dichlorohexafluoropropane and mineral spirits. 40 grams of this solution was mixed with 111 grams of mineral spirits and 0.1 gram of lauroyl peroxide was added to the mixture in a suitable reaction vessel. The atmosphere in the vessel was swept with nitrogen and the reaction mixture was heated to 89° C. under pressure (140 pounds per square inch) with agitation for one hour to introduce active sites into the rubber. It was then cooled to 30° C. Then 0.2 gram of benzoyl peroxide was dissolved in a mixture of 33 grams of methyl methacrylate, 65 grams of ethyl acrylate, and 2 grams of maleic anhydride, and the resulting mixture was added all at once to the first mixture. The mixture obtained thereby was heated at 87° C. After the elapse of about one hour and seven minutes, a definite cloudiness showing the formation of polymer became evident. The heating of the mixture was continued at about 87° to 93° C. for another hour and 20 minutes, whereupon 0.2 gram of lauroyl peroxide dissolved in 2 grams of mineral spirits was added. After continued heating at 90° to 102° C. for three hours, another addition of $2/10$ gram of lauroyl peroxide in 2 grams of mineral spirits was made and heating was continued at 90° to 100° C. for another hour and 25 minutes at which time another addition of 0.2 gram of lauroyl peroxide in 2 grams of mineral spirits was made and heating was continued at 87° to 102° C. for another five hours and five minutes. During all of the heating, the atmosphere in the vessel was swept with nitrogen and the reaction mixture was continuously agitated. The product amounted to a total of 251.3 grams of a polymer dispersion having 37.3% solids in which there was effected a 92.4% conversion of the monomer into the polymer. The milky dispersion had a slightly yellowish appearance. No solid matter was left on a filter.

(b) The dispersion was cast upon glass and metal plates and on drying on the ambient atmosphere produced clear films which were soft and tough and quite hydrophobic. The coating adhered well to metal but was separable from the glass as an integral film if dried under normal drying conditions up to about 100° C. However, the adhesion to glass was made quite strong by baking the coated glass plates for about 30 minutes at 150° C.

EXAMPLE 2

Example 1(a) was repeated except that the 11.2% pale crepe rubber solution was prepared in a solvent consisting of mineral spirits. To 100 parts of the 37.3% dispersion of part (a) in a closed pressure vessel there was added 20 parts of dichlorotetrafluoroethane at a pressure of 20 pounds per square inch. The diluted dispersion was coated on metal and glass plates, dried at 75° C. and part of the coated panels were baked at 150° C. for 30 minutes with results similar to those of Example 1(b).

EXAMPLE 3

Ten parts of a vinyltoluene-butadiene (about 60%/40%) copolymer was dissolved in 200 parts of a commercial octane (a mixture of various octane isomers) and 20 parts of dimethyl formamide was added. A solution of 0.4 part of benzoyl peroxide in 60 parts of acrylonitrile, 3 parts of maleic anhydride, and 27 parts of butyl acrylate was added followed by 0.02 part of dimethyl-para-toluidine. The mixture was stirred and heated to reflux temperature (79° C.). The polymer dispersion began to form after a very short induction period and the reflux temperature rose to 82° C. after 40 minutes. A solution of 0.8 part of lauroyl peroxide in 20 parts of octane was added followed by 0.04 part of dimethyl-para-toluidine and the polymer dispersion was stirred and heated at reflux temperature for one hour. A solution of 0.8 part of lauroyl peroxide in 20 parts of commercial octane was added followed by 0.04 part of dimethyl-para-toluidine. The mixture was heated to reflux temperature for one-half hour (86° C.) and allowed to cool. Then 50 parts of perfluoropentane was added. The dispersion formed a continuous film on metal plates upon drying at 100° C. The film is quite hydrophobic and resistant to water.

EXAMPLE 4

Ten parts of vinyltoluene-butadiene (about 60%/40%) copolymer was dissolved in 200 parts of commercial octane and a solution of 0.4 part of benzoyl peroxide in 45 parts of acrylonitrile and 45 parts of butyl acrylate were added. The mixture was stirred, 0.04 part of dimethyl-para-toluidine added, and heated to reflux temperature in a nitrogen atmosphere. After two hours the reflux temperature was 85° C. A solution of 0.4 part of lauroyl peroxide in 10 parts of commercial octane was added followed by 0.02 part of dimethyl-para-toluidine. Refluxing was continued for an additional hour at the end of which time the reflux temperature was 95° C. A mixture of 10 parts of dimethyl formamide and 22 parts of dichlorooctafluorobutane was added to the resulting polymer dispersion which was then formed by casting into a continuous film which was flexible, tough, and insensitive to moisture.

Dispersions were prepared in a similar manner substituting acrylonitrile (54 parts) and 2-ethylhexyl acrylate (36 parts) for the acrylonitrile-butyl acrylate monomer mixture of the above example. The dispersions produced films of similar character.

EXAMPLE 5

Fifteen parts of vinyltoluene-butadiene (about 60%/40%) copolymer was dissolved in 200 parts of commercial octane. To this was added 0.04 part of dimethyl-para-toluidine and a solution of 0.4 part of benzoyl peroxide in 85 parts of vinyl acetate. The mixture was stirred and heated to reflux temperature for four hours. A solution of 0.4 part of lauroyl peroxide in 10 parts of commercial octane was then added followed by 0.04 part of dimethyl-para-toluidine. After an additional three hours of refluxing, a solution of 0.4 part of lauroyl peroxide in 10 parts of octane was added followed by 0.03 part of dimethyl-para-toluidine. Refluxing was continued for four hours and the resulting polymer dispersion was allowed to cool. Then 150 parts of perfluoropentane was added. The polyvinyl acetate dispersion formed continuous moisture-resistant films on casting at 50° C.

EXAMPLE 6

Ten parts of a vinyltoluene-butadiene (about 60%/40%) copolymer was dissolved in 210 parts of commercial hexane and 0.066 part of lauroyl peroxide was added. The mixture was stirred and heated at 95° C. while a solution of 0.134 part of lauroyl peroxide in 90 parts of methyl acrylate was added slowly over the course of 2½ hours. The mixture was stirred and heated at 90° to 96° C. for an additional hour. A white polymer dispersion was obtained. Then 160 parts of trichlorofluoromethane was added and mixed in while the dispersion was held under a pressure of 60 pounds per square inch in a closed vessel to provide an aerosol spray composition therein in which the halohydrocarbon serves as the propellant. The poly(methyl acrylate) dispersion was sprayed on the back of a paper sheet and another paper sheet was then applied to the coated face. On drying, a grease-resistant laminate was obtained.

EXAMPLE 7

A mixture of five parts of unmilled cyclized natural rubber, 90 parts of methyl methacrylate, 0.2 part of benzoyl peroxide and 200 parts of octane was stirred and heated to reflux temperature. After two hours the reflux temperature had reached 102° C. and a stable polymer dispersion had formed. Then 160 parts of dichlorodifluoromethane was added and mixed in while the dispersion was held under a pressure of 60 pounds per square inch in a closed vessel to provide an aerosol spray composition therein in which the halohydrocarbon serves as the propellant. A glossy finish was obtained on a metal plate primed with an epoxy resin by spraying the methyl methacrylate polymer dispersion as a topcoat at a temperature of about 95° C.

EXAMPLE 8

Ten parts of a copolymer of about 10% of N-vinylpyrrolidone, about 30% of butyl acrylate, about 35% of lauryl methacrylate, and about 25% of stearyl methacrylate in 15 parts of toluene and 0.2 part of benzoyl peroxide were added to 185 parts of a commercial octane. The mixture was stirred and heated to 107° C. for 45 minutes. A mixture of 45 parts of methyl methacrylate and 45 parts of ethyl acrylate was added and the mixture was refluxed for two hours. A stable polymeric dispersion resulted. Then 160 parts of trichlorofluoromethane was added and mixed in while the dispersion was held under a pressure of 60 pounds per square inch in a closed vessel to provide an aerosol spray composition therein in which the halohydrocarbon serves as the propellant. The dispersion was applied (by spraying) as a base-coat to handbuff and full-grain leathers.

EXAMPLE 9

Four parts of a butadiene-styrene (70%/30%) copolymer and 0.1 part of benzoyl peroxide were dissolved in a mixture of 50 parts of monochloropentafluoroethane and 25 parts of toluene and heated to 107° C. for 45 minutes under a pressure of 500 pounds per square inch. A mixture of 22.5 parts of ethyl acrylate and 22.5 parts of methacrylic acid was then added and the resulting solution was stirred and heated at 107° C. for five hours under pressure. A low viscosity polymer dispersion was formed. Cellulosic yarns were warp sized by passage through this dispersion at room temperature after dilution with toluene to 15% polymer concentration. The size was readily removable on washing in a warm aqueous alkaline solution (0.5% $Na_2CO_3$).

EXAMPLE 10

(a) A solution of 100 parts of poly(isobutylene) (Enjay 035 Butyl Rubber) and 1.2 parts of lauroyl peroxide in 900 parts of mineral spirits boiling in the range of 310° to 394° F. was heated to 100° C. while air was bubbled through the solution until the viscosity of the rubber solution had dropped from 373 cps. to 1 centipoise.

(b) Three hundred and thirty parts of the above oxidized butyl rubber solution, 303 parts of the same mineral spirits, and 0.5 part of lauroyl peroxide were mixed, deaerated with nitrogen and heated to 100° C. for one hour. The temperature was lowered to 90° C. and a mixture of 141.8 parts of methyl methacrylate, 141.8 parts of ethyl acrylate, and 0.4 part of benzoyl peroxide was added over the course of two hours. A mixture of 141.8 parts of ethyl acrylate, 141.8 parts of methyl methacrylate, 0.4 part of benzoyl peroxide, and 275 parts of aliphatic hydrocarbon solvent naphtha boiling in the range of 244° to 291° F. was added over the course of two hours. A solution of 1.2 parts of lauroyl peroxide in 25 parts of the same solvent naphtha was then added over the course of three hours. The polymer dispersion was concentrated to 58.1% solids by removing the naphtha and residual monomer by distillation under reduced pressure. The resulting dispersion was stable and had a viscosity (Brookfield) of 480 cps.

(c) The dispersion obtained in part (b) was diluted with mineral spirits to 50% solids and then the 50% dispersion was mixed with various proportions of Freon 11 (trichlorofluoromethane) and/or Freon 12 (dichlorodifluoromethane) at the pressures indicated to give aerosol sprays at various solids concentrations as indicated in the following table

| Percent Polymer Dispersion of part (b) | Percent Freon 11 | Percent Freon 12 | Percent Solids in Resulting Dispersion | Pressure p.s.i. |
|---|---|---|---|---|
| 25 | 37.5 | 37.5 | 12.5 | 40 |
| 30 | 35.0 | 35.0 | 15.0 | 35 |
| 50 | 25.0 | 25.0 | 25.0 | 25 |
| 60 | 15.0 | 25.0 | 30.0 | 30 |
| 60 | 10.0 | 30.0 | 30.0 | 35 |
| 60 | 5.0 | 35.0 | 30.0 | 45 |
| 60 | ---------- | 40.0 | 30.0 | 50 |
| 55 | ---------- | 45.0 | 27.5 | 55 |

The dispersions were sprayed on Bonderized and bare cold-rolled steel panels. After drying and baking at 300° F. for 30 minutes, the coatings had excellent adhesion and gloss.

We claim:

1. A process for producing a dispersion of a polymer in a substantially anhydrous essentially inert liquid medium which comprises initially dissolving a polymer selected from the group consisting of natural and synthetic rubber polymers, oxidized vegetable oils, and oil-soluble polymers formed exclusively of monoethylenically unsaturated molecules comprising at least one ester of an acid of the formula

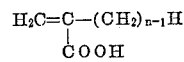

in which $n$ is an integer having a value of 1 to 2, with an alcohol having 4 to 18 carbon atoms in an anhydrous liquid medium consisting essentially of a mixture of (a) at least one member selected from the group consisting of aliphatic, aromatic, and naphthenic hydrocarbons and (b) at least one fluorinated aliphatic hydrocarbon having 1 to 5 carbon atoms, the weight ratio of (a) to (b) being from 1:10 to 10:1, the liquid medium containing about 0.1 to 5% by weight, based on the weight of the dissolved polymer, of an addition-polymerization catalyst, the pressure being in the range of normal atmospheric pressure to superatmospheric pressure to assure that, at the temperature of the polymerization, it occurs in the anhydrous medium while in liquid state, heating the mixture for a period of at least 5 minutes to one hour at a temperature of at least 65° C. to 120° C. to form active sites on the polymer, the time being longer at lower temperatures in the range and being shorter at the higher temperatures in the range, and the temperature and time of heating being less than that which effects cross-linking, then adding at least one polymerizable ethylenically unsaturated monomer having at least one group of the formula

to the polymer solution and effecting polymerization at a temperature in a range from about −10° C. to about 120° C. to produce a stable dispersion of solid polymer particles insoluble in the medium and having sizes in the range of about 0.05 to 10 microns, the weight of monomer added being sufficient to produce a concentration, in the final dispersion, of at least about 1% to about 55% by weight of the aforesaid dispersed insoluble solid polymer particles, the amount of the aforementioned polymer initially dissolved in the hydrocarbon medium being about 2 to 20% by weight, based on the weight of the polymer to be dispersed.

2. A process for producing a dispersion of a polymer in a substantially anhydrous essentially inert liquid medium which comprises initially dissolving a polymer selected from the group consisting of natural and synthetic rubber polymers, oxidized vegetable oils, and oil-soluble polymers formed exclusively of monoethylenically unsaturated molecules comprising at least one ester of an acid of the formula

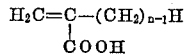

in which $n$ is an integer having a value of 1 to 2, with an alcohol having 4 to 18 carbon atoms in an anhydrous liquid medium consisting essentially of a mixture of (a) at least one member selected from the group consisting of aliphatic, aromatic, and naphthenic hydrocarbons and (b) at least one fluorinated aliphatic hydrocarbon having 1 to 5 carbon atoms, the weight ratio of (a) to (b) being from 1:10 to 10:1, the liquid medium containing about 0.1 to 5% by weight, based on the weight of the dissolved polymer, of an addition-polymerization catalyst, the pressure being in the range of normal atmospheric pressure to superatmospheric pressure to assure that, at the temperature of the polymerization, it occurs in the anhydrous medium while in liquid state, heating the mixture for a period of at least 5 minutes to one hour at a temperature of at least 65° C. to 120° C. to form active sites on the polymer, the time being longer at lower temperatures in the range and being shorter at the higher temperatures in the range, and the temperature and time of heating being less than that which effects cross-linking, then adding to the polymer solution at least one polymerizable ethylenically unsaturated monomer selected from the group consisting of acrylic acid, methacrylic acid and their anhydrides, amides, nitriles, and esters with a member selected from the group consisting of alcohols having 1 to 18 carbon atoms, glycidol, and aminoalkanols, fumaric acid, crotonic acid, maleic anhydride, vinyl chloride, vinyl and allyl esters of an aliphatic acid having 1 to 18 carbon atoms, and polymerizable monoethylenically unsaturated hydrocarbons having 2 to 9 carbon atoms, vinyl pyrrolidone, vinyl ethers, and vinyl sulfides, and effecting polymerization at a temperature in a range from about $-10°$ C. to about 120° C. to produce a stable dispersion of solid polymer particles in the hydrocarbon medium and having sizes in the range of about 0.05 to 10 microns, the weight of monomer added being sufficient to produce a concentration, in the final dispersion, of at least about 1% to about 55% by weight of the aforesaid dispersed insoluble solid polymer particles, the amount of the aforementioned polymer initially dissolved in the hydrocarbon medium being about 2 to 20% by weight, based on the weight of the polymer to be dispersed.

3. A process for producing a dispersion of a polymer in a substantially anhydrous essentially inert liquid medium which comprises dissolving an oil-soluble acrylic polymer in an anhydrous liquid medium consisting essentially of a mixture of (a) at least one member selected from the group consisting of aliphatic, aromatic, and naphthenic hydrocarbons and (b) at least one fluorinated aliphatic hydrocarbon having 1 to 5 carbon atoms, the weight ratio of (a) to (b) being from 1:10 to 10:1, the liquid medium containing about 0.1 to 5% by weight, based on the weight of the dissolved polymer, of an addition-polymerization catalyst, the pressure being in the range of normal atmospheric pressure to superatmospheric pressure to assure that, at the temperature of the polymerization, it occurs in the anhydrous medium while in liquid state, said acrylic polymer being a hydrocarbon-soluble polymer containing sufficient hydrocarbon groups of at least four carbon atoms to impart solubility thereof in the hydrocarbon medium selected from the group consisting of homopolymers and copolymers of at least one ester of an acid of the formula

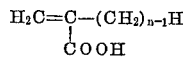

where $n$ is an integer having a value of 1 to 2 with an alcohol having 4 to 18 carbon atoms, heating the mixture for a period of at least 5 minutes to one hour at a temperature of at least 65° C. to 120° C. to form active sites on the polymer, the time being longer at lower temperatures in the range and being shorter at the higher temperatures in the range, and the temperature and time of heating being less than that which effects cross-linking, then adding to the polymer solution at least one polymerizable monomer selected from the group consisting of acrylic acid, methacrylic acid and their anhydrides, amides, nitriles, and esters with a member selected from the group consisting of alcohols having 1 to 18 carbon atoms, glycidol, and aminoalkanols, fumaric acid, crotonic acid, maleic anhydride, vinyl chloride, vinyl and allyl esters of an aliphatic acid having 1 to 18 carbon atoms, and polymerizable monoethylenically unsaturated hydrocarbons having 2 to 9 carbon atoms, vinyl pyrrolidone, vinyl ethers, and vinyl sulfides, and effecting polymerization at a temperature in a range from about $-10°$ C. to about 120° C. to produce a stable dispersion of solid polymer particles insoluble in the hydrocarbon medium and having sizes in the range of about 0.05 to 10 microns, the weight of monomer added being sufficient to produce a concentration, in the final dispersion, of at least about 1% to about 55% by weight of the aforesaid dispersed insoluble solid polymer particles, the amount of the aforementioned oil-soluble acrylic polymer initially dissolved in the hydrocarbon medium being about 2 to 20% by weight, based on the weight of the polymer to be dispersed.

4. A process as defined in claim 3 in which the oil-soluble acrylic polymer is a copolymer of N-vinyl-pyrrolidinone, butyl acrylate, lauryl methacrylate, and stearyl methacrylate.

References Cited

UNITED STATES PATENTS

| | | | |
|---|---|---|---|
| 2,858,281 | 10/1958 | Bauman et al. | 260—45.5 |
| 2,964,165 | 12/1960 | Riley | 260—33.8 |
| 2,617,780 | 11/1952 | Lutz | 260—33.8 |
| 2,799,669 | 7/1957 | Zoss | 260—33.8 |
| 2,837,496 | 6/1958 | Vandenberg | 260—33.6 |
| 3,095,388 | 6/1963 | Osmond et al. | 260—33.6 |
| 2,731,439 | 1/1956 | Jones et al. | 260—45.5 |
| 2,987,501 | 6/1961 | Rieke et al. | 260—45.5 |
| 3,073,794 | 1/1963 | Stoner | 260—33.8 |
| 2,847,414 | 9/1958 | Schmidle et al. | |

FOREIGN PATENTS

| | | |
|---|---|---|
| 216,911 | 7/1958 | Australia. |
| 575,403 | 5/1959 | Canada. |

JAMES A. SEIDLECK, *Primary Examiner.*

A. H. KOECKERT, *Assistant Examiner.*